United States Patent
Cude et al.

(10) Patent No.: US 9,970,563 B2
(45) Date of Patent: May 15, 2018

(54) VALVE CAP WITH INTEGRAL SEAL

(71) Applicants: TRANE INTERNATIONAL INC., Piscataway, NJ (US); TRANE AIR CONDITIONING SYSTEM (CHINA) CO., LTD., Jiangsu (CN)

(72) Inventors: James Russell Cude, Lynn Haven, FL (US); Michial Ernest Kirksey, Lynn Haven, FL (US); Guangwei Rong, Kunshan (CN)

(73) Assignees: TRANE INTERNATIONAL INC., Davidson, NC (US); TRANE AIR CONDITIONING SYSTEMS (CHINA) CO., LTD., Taicang, Jiangsu Province (CN)

( * ) Notice: Subject to any disclaimer, the term of this patent is extended or adjusted under 35 U.S.C. 154(b) by 0 days. days.

(21) Appl. No.: 14/893,860

(22) PCT Filed: May 24, 2013

(86) PCT No.: PCT/CN2013/076197
§ 371 (c)(1),
(2) Date: Nov. 24, 2015

(87) PCT Pub. No.: WO2014/186975
PCT Pub. Date: Nov. 27, 2014

(65) Prior Publication Data
US 2016/0109033 A1    Apr. 21, 2016

(51) Int. Cl.
*F16K 15/20* (2006.01)
*F16K 27/08* (2006.01)
(Continued)

(52) U.S. Cl.
CPC ............. *F16K 27/08* (2013.01); *F16J 15/04* (2013.01); *F16L 55/1152* (2013.01)

(58) Field of Classification Search
CPC .. F16K 15/205; F16K 27/08; F25B 2345/006; B65D 53/00; B65D 53/06; B65D 41/105; Y10T 137/374
(Continued)

(56) References Cited

U.S. PATENT DOCUMENTS 729,129 A    5/1903   Catterall
3,542,913 A * 11/1970  Robinson ................ B29C 43/00
                                              264/242
(Continued)

FOREIGN PATENT DOCUMENTS

CN    2695760       4/2005
DE    3623830 A1 *  2/1987  ............. F16K 27/08
KR    100775041     11/2007

OTHER PUBLICATIONS

International Search Report and Written Opinion for International Application No. PCT/CN2013/076197, dated Mar. 6, 2014, 13 pgs.

*Primary Examiner* — Reinaldo Sanchez-Medina
(74) *Attorney, Agent, or Firm* — Hamre, Schumann, Mueller & Larson, P.C.

(57) ABSTRACT

A valve cap (14) can be configured to have an integral sealing member (50) at least part of which is extendable into an opening (18) of a valve body (12) and seals against an inner surface of a valve body wall (16). The sealing member (50) is configured to have a void space (51) such that when fluid leaks from a valve stem disposed in the valve body (12), an internal pressure in the void space forces a surface of the sealing member (50) against the inner surface of the valve body wall (16), thereby tightening a seal between the sealing member (50) and the valve body wall (16). In such circumstances, the fluid is prevented effectively from exiting the valve cap (14).

13 Claims, 4 Drawing Sheets

(51) Int. Cl.
*F16J 15/04* (2006.01)
*F16L 55/115* (2006.01)

(58) Field of Classification Search
USPC .................................................. 137/232, 296
See application file for complete search history.

(56) References Cited

U.S. PATENT DOCUMENTS

| | | | | |
|---|---|---|---|---|
| 3,811,006 A * | 5/1974 | Burnell | ................. | H02G 15/26 |
| | | | | 137/232 |
| 3,916,947 A | 11/1975 | Holmes et al. | | |
| 3,978,881 A | 9/1976 | Mouranie et al. | | |
| 4,580,601 A * | 4/1986 | Schlotman | ............... | F16K 27/08 |
| | | | | 137/625.17 |
| 4,766,628 A | 8/1988 | Walker | | |
| 4,776,363 A * | 10/1988 | Avelli | ....................... | E03B 9/04 |
| | | | | 137/272 |
| 5,341,833 A | 8/1994 | Davis | | |
| 5,653,256 A | 8/1997 | Myers et al. | | |
| 5,871,111 A * | 2/1999 | Pfefferkorn | ........ | B65D 41/0421 |
| | | | | 215/307 |
| 5,915,574 A * | 6/1999 | Adams | ................... | B65D 5/746 |
| | | | | 215/252 |
| 5,957,147 A | 9/1999 | Hubbell, Jr. | | |
| 6,266,971 B1 | 7/2001 | Schroder et al. | | |
| 6,338,414 B1 * | 1/2002 | Schellenbach | ..... | B65D 41/0421 |
| | | | | 215/252 |
| 6,491,175 B1 * | 12/2002 | Taha | ..................... | B29C 45/262 |
| | | | | 215/252 |
| 6,546,952 B1 | 4/2003 | Martin et al. | | |
| 6,702,134 B2 * | 3/2004 | Scalese | ............... | B01L 3/50825 |
| | | | | 215/329 |
| 6,889,857 B2 * | 5/2005 | Francois | ............ | B65D 41/0421 |
| | | | | 215/232 |
| 7,207,453 B2 * | 4/2007 | Rossi | ................ | B65D 41/3428 |
| | | | | 215/252 |
| 7,770,601 B2 * | 8/2010 | Perry | ..................... | B60C 29/06 |
| | | | | 137/232 |
| 2001/0027957 A1 * | 10/2001 | Kano | ................ | B65D 41/0421 |
| | | | | 215/341 |
| 2002/0158037 A1 * | 10/2002 | Kano | ................ | B65D 41/0421 |
| | | | | 215/341 |
| 2003/0217595 A1 | 11/2003 | Banzhof et al. | | |
| 2004/0204699 A1 * | 10/2004 | Hanly | ....................... | A61J 1/10 |
| | | | | 604/408 |
| 2008/0128646 A1 * | 6/2008 | Clawson | ................ | A61M 39/26 |
| | | | | 251/149.1 |
| 2012/0042969 A1 | 2/2012 | Davidson | | |

\* cited by examiner

VALVE CAP WITH INTEGRAL SEAL

TECHNICAL FIELD

This disclosure relates generally to valve assemblies, and particularly, but not by way of limitation, to valve caps with an integral seal and methods of making the same.

BACKGROUND ART

Valve caps are used to seal a valve as well as to prevent dirt or debris from entering the valve. An O-ring is commonly used to seal a valve cap to a valve.

DISCLOSURE OF INVENTION

Some embodiments of a valve cap can be configured to have an integral sealing member at least part of which is extendable into an opening of a valve body and seals against an inner surface of a valve body. The sealing member is configured to have a void space such that when a fluid leaks from a valve stem disposed in the valve body, an internal pressure in the void space can force a surface of the sealing member against the inner surface of the valve body, thereby tightening a seal between the sealing member and the valve body. In such circumstances, the fluid can be effectively prevented from exiting the valve cap.

Particular embodiments include a valve assembly including a valve body that has a cylindrical wall and a free end defining an opening. The valve body defines an interior space. The valve assembly also includes a valve cap that closes the opening of the valve body. The valve cap includes a side wall and a closed end connected to the side wall. The side wall and the closed end define an interior space. The valve cap also includes an integral sealing member that extends from the closed end into the interior space. At least part of the integral sealing member is extendable into the opening of the valve body and seals against an inner surface of a valve body. A void space is formed along a surface of the seal member such that when a fluid may leak from a valve stem disposed in a valve body, an internal pressure in the void space can force a surface of the sealing member against the inner surface of the valve body, thereby tightening a seal between the sealing member and the valve body.

Some embodiments include a valve cap configured to close an opening of a valve body, where the valve body has an opening from which fluid may exit from the valve body. The valve cap includes a side wall and a closed end connected to the side wall. The side wall and the closed end define an interior space. The valve cap also includes an integral sealing member that extends from the closed end into the interior space. At least part of the sealing member is extendable into the opening of the valve body and seals against an inner surface of a valve body. A void space is defined by the sealing member such that when fluid leaks from a valve stem disposed in the valve body, an internal pressure in the void space can force a surface of the sealing member against the inner surface of the valve body, thereby tightening a seal between the sealing member and the valve body.

Other embodiments may include a method for tightening a seal formed between a valve body and a valve cap. The method includes extending at least part of a sealing member formed on the valve cap into an interior space defined in the valve body to form a seal between an inner surface of the valve body and an outer surface of the sealing member; and forcing the outer surface of the sealing member against the inner surface of the valve body by an internal pressure caused by leakage of fluid into the valve body, thereby tightening the seal between the sealing member and the valve body.

For example, the sealing member can be a circular flange extending from a closed end of the valve cap. When assembled with a valve body, the flange extends into an opening of the valve body and engages with the inner surface of a valve body. When fluid leaks for example from a valve stem disposed in the valve body, an internal pressure in a void space defined by the flange can force a surface of the flange against the inner surface of the valve body, thereby tightening a seal between the flange and the valve body.

Moreover, in some embodiments, the valve cap can be configured to include a pair of handles extending radially from an outer surface of the side wall of the valve cap, thereby permitting ease of assembly and disassembly.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Description of Drawings

Figure 1:
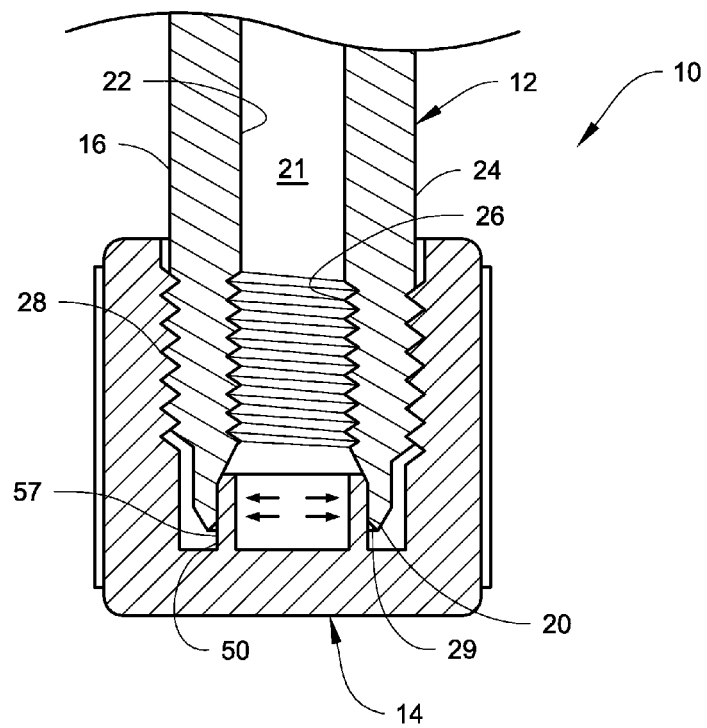

FIG. 1 is a partial cross-section view of a valve assembly with a valve cap coupled to a valve body.

Figure 2A:
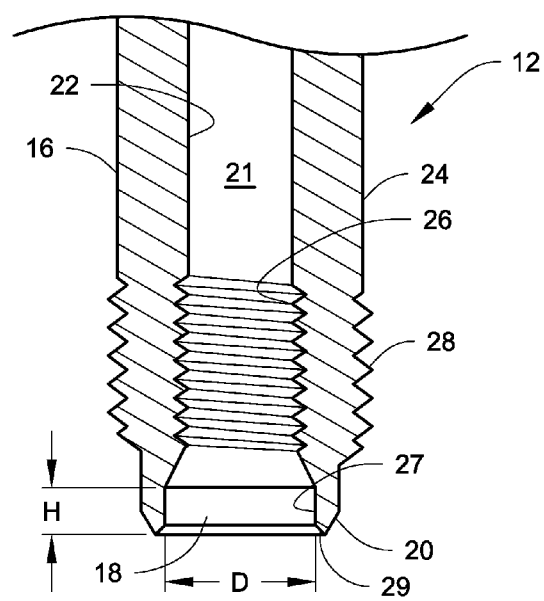

FIG. 2A is a partial cross-section view of a valve body of FIG. 1.

Figure 2B:
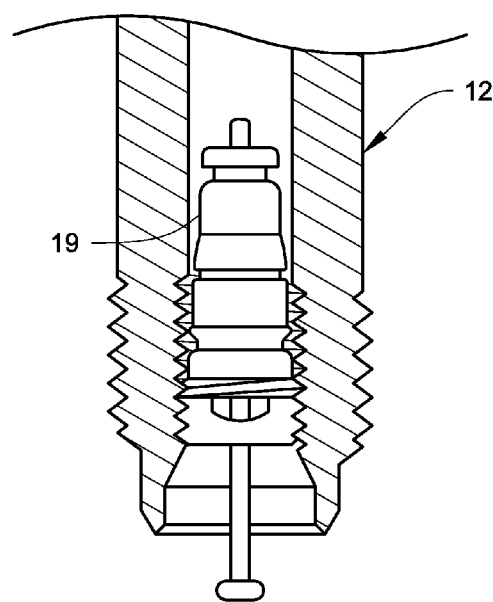

FIG. 2B is a sectional view of a valve body of FIG. 1 including a valve stem therein.

Figure 3:
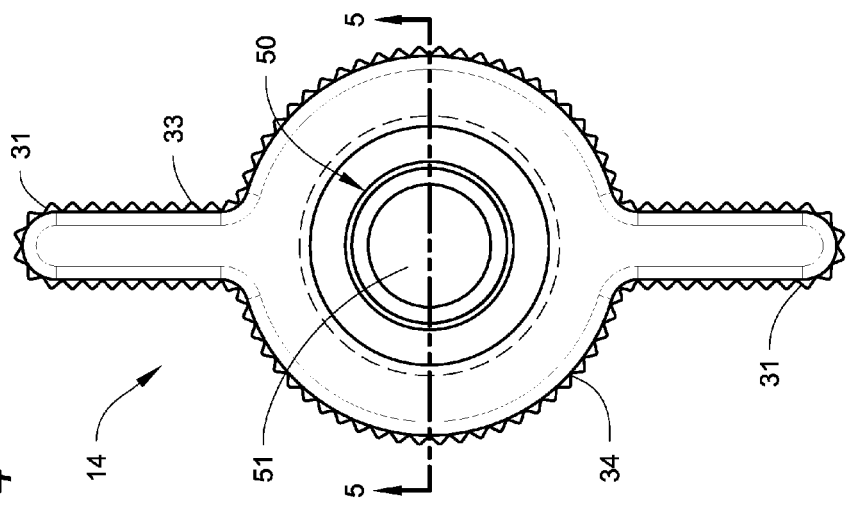

FIG. 3 is a perspective view of the valve cap of FIG. 1.

Figure 4:
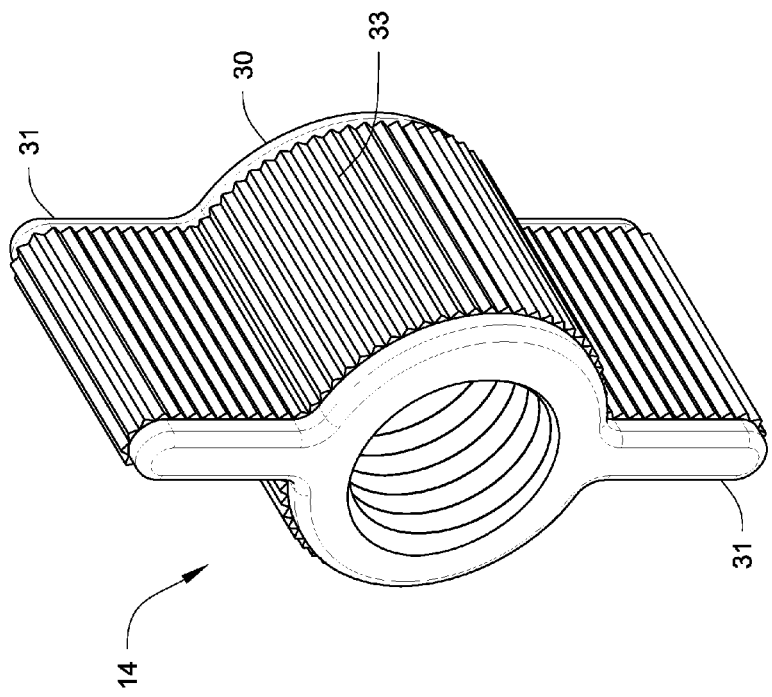

FIG. 4 is a top view of the valve cap of FIG. 1, when viewing into an opening defined by a valve cap body.

Figure 5:
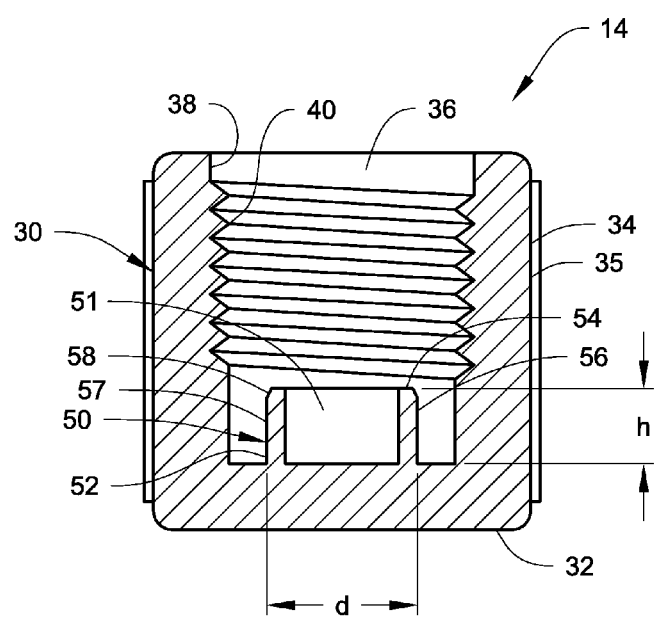

FIG. 5 is a cross-section view of the valve cap of FIG. 4 taken along line A-A.

Like reference symbols in the various drawings indicate like elements.

BEST MODE FOR CARRYING OUT THE INVENTION

Best Mode

Some embodiments of a valve cap can be configured to have an integral sealing member at least part of which is extendable into an opening of a valve body and seals against an inner surface of a valve body. The sealing member is configured to have a void space such that when fluid leaks from a valve stem disposed in the valve body, an internal pressure in the void space can force a surface of the sealing member against the inner surface of the valve body, thereby tightening a seal between the sealing member and the valve body. In such circumstances, the fluid can be effectively prevented from exiting the valve cap.

For example, the sealing member can be a circular flange extending from a closed end of the valve cap. When assembled with a valve body, the flange extends into an opening of the valve body and engages with the inner surface of a valve body. When fluid leaks from a valve stem disposed in the valve body, an internal pressure in a void space defined by the flange forces a surface of the flange against the inner surface of the valve body, thereby tightening a seal between the flange and the valve body. This permits a low cost solution for preventing the fluid from exiting the valve cap.

Moreover, in some embodiments, the valve cap can be configured to include a pair of handles extending radially from an outer surface of the side wall of the valve cap, thereby permitting ease of assembly and disassembly.

In some embodiments, the valve cap is used to cover and seal an opening of a refrigerant valve used in a refrigeration system such that leakage of refrigerant is prevented effectively. In some embodiments, the valve cap is configured to seal a refrigerant valve with an operating pressure ranged from about 10 psig to about 1400 psig. In some embodiments, the valve can be a spring-loaded automatic-sealing valve. As one practical example, the valve cap can be used with a compressor of a refrigeration system using for example R-410a refrigerant and under conditions of having a mildly dirty outdoor coil, where the compressor may have a normal operating pressure of about 650 psi at its discharge port under a 125° F. ambient air. In some embodiments, the valve cap can be configured to be used on any refrigerant service valve that employs suitable refrigerant or lubrication oil in a refrigeration system.

It is to be understood that the refrigeration system can be used to cool various indoor spaces, such as a conditioned space for residential, commercial or industrial refrigeration systems, or a cargo space in transport refrigeration units. However, it is to be understood that the valve cap can be used to cover and seal valves used in applications other than refrigeration systems such as gas valves or other liquid valves, to prevent leakage of fluid, such as gas or other types of liquid.

The terms "above," "on," "under," "top," "bottom," "up," "down," "upper," "lower," "horizontal," "vertical," "front," "rear," "left," "right" and the like used herein are in reference to the relative positions of the valve assembly and its constituent parts, as oriented in the specific figures being described. These terms are not meant to be limiting in any way.

Referring to FIGS. 1 and 2A-B, a valve assembly 10 includes a valve body 12 having a valve stem 19 (see FIG. 2B) disposed therein and a valve cap 14. The valve body 12 has a cylindrical wall 16 defining an opening 18 at a free end 20 of the wall 16 and an interior space 21. The cylindrical wall 16 has an inner surface 22 and an outer surface 24. In the depicted embodiment as shown in FIG. 1, inner threads 26 and outer threads 28 can be constructed on both the inner and outer surfaces 22, 24 of the cylindrical wall 16 adjacent to the free end 20, respectively. However, it is to be understood, that the wall 16 can be constructed without the inner threads 26. A sealing section 27 engageable with a sealing member 50 of the valve cap 14 is a part of the inner surface 22 proximate the free end 20. A diameter of the sealing section 27 is D and a height of the sealing section 27 is H. In some embodiments, the free end 20 has a convergently tapered inner periphery 29 to facilitate insertion of the sealing member 50 of the valve cap 14 into the opening 18.

Referring to FIGS. 3-5, the valve cap 14 has a cap body 30 and in some embodiments, includes a pair of handles 31, such as wings, extending radially from an outer surface 35 of the side wall 34 of the valve cap 14. The cap body 30 is configured to cover and seal the opening 18 of the valve body 12 such that leakage of fluid can be prevented effectively. The cap body 30 has a closed end 32 and a sidewall 34 extending therefrom terminating at an opening 36. The side wall 34 has an inner surface 38 having a profile complementary to the outer surface 24 of the portion of the valve body 12 that is receivable in the valve cap 14. Inner threads 40 positioned to be complementary to the outer threads 28 of the valve body 12 are constructed on the inner surface 38 of the valve cap 14.

Referring to FIGS. 1 and 3-5, the cap body 30 may be configured to have an integral sealing member 50 at least part of which is extendable into the interior space 21 defined by the cylindrical wall 16 of the valve body 12 and seal against the inner surface 22 of the cylindrical wall 16. In the depicted embodiment as shown in FIGS. 1 and 3-5, the sealing member 50 takes a form of a cylindrical flange extending from the closed end 32 toward the opening 36 and defining a void space 51. The sealing member 50 defines a void space 51 and can be coaxial with the side wall 34. The sealing member 50 has a height h. In some embodiments, the height h of the sealing member 50 is greater than the height H of the sealing section 27 on the valve body 12.

The sealing member 50 has a proximal end 52 connected to the closed end 32 of the cap body 30, a distal end 54 opposite to the proximal end 52 and a side wall 56 extending between the proximal end 52 and the distal end 54.

The side wall 56 has an outer surface 57 configured to be engageable with the inner surface 22 of the valve body 12 to form a seal. An outer diameter of the side wall 56 of the sealing member 50 is d, slightly greater than the inner diameter D of the sealing section 27 on the valve body 12 to warrant formation of an effective seal between the sealing member 50 and an inner surface valve body 12. In some embodiments, the distal end 54 has a tapered outer periphery 58 to facilitate insertion of the distal end 54 into the opening 18 of the valve body 12.

It is to be understood that the sealing member 50 can vary in heights, shapes and sizes as along as the void space 51 is formed to allow an internal pressure in the void space 51 to force the outer surface 57 of the sealing member 50 against the inner surface 22 of the valve body 12 to tighten the seal. It is to be understood that the internal pressure is a pressure suitable to press the seal member 50 such as the cylindrical flange to effectively tighten the seal.

When in use, for example, the sealing member 50 is inserted into the valve body 12, once the valve cap 14 is screwed onto the outer threads 28 of the valve body 12. The tapered outer periphery 58 of the sealing member 50 is inserted slightly into the opening 18 defined by the convergently tapered inner periphery 29 of the valve body 12 in an uncompressed state, and then advanced further into the opening 18 such that the sealing section 27 formed on the inner surface 22 of the valve body 12 forms a tight compressive seal around the outer surface 57 of the sealing member 50. This effectively seals the sealing member 50 on to the inner surface 22 of the valve body 12, and can prevent fluid from escaping from the interior space 21 between the inner surface 22 of the valve body 12 and the outer surface 57 of the sealing member 50.

Referring to FIGS. 1 and 2A-B, when fluid leaks from the valve stem 19 disposed in the valve body 12 (see FIG. 2B), an internal pressure in the void space 51 forces the outer surface 57 of the sealing member 50 against the inner surface 22 of the valve body 12 in a direction as shown by the arrows in FIG. 1, thereby tightening the seal between the sealing member 50 and the valve body 12. That is, the sealing member 50 allows the seal between the outer surface 57 of the sealing member 50 and the inner surface 22 of the valve body 12 to become tighter in the event fluid leaks from the valve stem 19 disposed in the valve body 12. As a result, the fluid leaking from the valve stem 19 can help increase the effectiveness of the seal between the valve cap 14 and the valve body 12.

Referring to FIGS. 3 and 4, optionally, a pair of handles 31 can extend radially from an outer surface 35 of the side wall 34 of the cap body 30. Each handle 31 can have a same height as the height of the side wall 34 of the cap body 30. Optionally, surface roughening 33 can be formed on the outer surface of the valve cap 14. However, it is to be understood that the configuration of the valve cap 14 can vary. For example, the pair of handles 31 can take other shapes and/or sizes as long as it helps assemble and disassemble the valve cap. In some embodiments, the handles 31 help a user to assemble and disassemble the valve cap 14 without a tool.

The valve cap 14 can be made of various materials. In some embodiments, the valve cap 14 can be made of non-metallic materials. However, it is to be understood that the valve cap 14 can also be made of other suitable materials as desired.

In some embodiments, the valve cap 14 is made of glass filled nylon, e.g., nylon 66. It is to be understood that any oil and/or refrigerant resistant plastic that is moldable and has a melting point above about 300° F. can be used for making the valve cap 14. In some embodiments, the sealing member 50, such as the cylindrical flange, can be made of the same material as the other portions of the valve cap 14.

Alternatively, the sealing member 50, such as the cylindrical flange, can be made of a different material than the other portions of the valve cap 14. In some embodiments, the sealing member 50, such as the cylindrical flange, is be made of a soft material that allows the sealing member 50 to have flexibility to deform sufficiently and enter the opening 18 of the valve body 12 and expand to the original shape upon entering the interior space 21. For example, the sealing member 50, such as the cylindrical flange, can be made of a soft polymer-based compound such as polyurethane or the like to provide the flexibility required for forming a compressive seal.

On the other hand, the other portions of the valve cap 14 can be made of a harder material such as polycarbonate, ABS (a compound of acrylonitrile butadiene and styrene) to avoid cross-threading.

The valve cap 14 can be fabricated by various methods, such as injection molding. In some embodiments, when the valve cap 14 is made of dissimilar materials, it can be made by over-molding processes.

It is to be understood that it is merely exemplary to employ threads to secure the valve cap 14 on the valve body 12. Other suitable connections, such as snap fit connection or the like, can also be used to secure the valve cap 14.

A number of embodiments of the invention have been described. Nevertheless, it will be understood that various modifications may be made without departing from the spirit and scope of the invention. Accordingly, other embodiments are within the scope of the following claims.

The invention claimed is:

1. A valve assembly, comprising:
   a first integrally formed structural member including a valve body that has a cylindrical wall and a free end defining an opening, the valve body defining an inner space; and
   a second integrally formed structural member including a valve cap that closes the opening of the valve body, the valve cap comprising:
   a side wall;
   a closed end connected to the side wall, the closed end and the side wall defining an interior space;
   an integral sealing member that extends from the closed end into the interior space, at least part of the integral sealing member being extendable into the opening of the valve body and seals against an inner surface of the valve body, the integral sealing member being cylindrical and concentric with the side wall of the cap;
   a first void space defined by an inner surface of the integral sealing member; and
   a second void space in an annular shape defined by an outer surface of the integral sealing member, an inner surface of the side wall of the valve cap and an inner surface of the closed end of the valve cap,
   wherein the free end of the valve body is received in the second void space,
   wherein the integral sealing member being flexible such that when an internal pressure in the first void space increases due to a flow of fluid leaking toward the opening of the valve body, the integral sealing member is pressurized against the inner surface of the valve body, thereby tightening a seal between the integral sealing member and the valve body,
   wherein the integral sealing member has a distal end, the outer surface of the integral sealing member tapers toward the distal end and tapers inwardly toward the inner surface of the integral sealing member to facilitate insertion of the free end of the valve body into the second void space, and
   wherein an inner diameter of the valve body at a threaded section is smaller than an outer diameter of the integral sealing member.

2. The valve assembly of claim 1, wherein the inner surface of the valve body tapers inwardly, tracking the tapered outer surface of the integral sealing member at the distal end of the integral sealing member when the valve cap closes the opening of the valve body.

3. The valve assembly of claim 2, wherein the valve body has a constant inner diameter and the integral sealing member has a constant outer diameter, the constant inner diameter being smaller than the constant outer diameter.

4. The valve assembly of claim 1, wherein the valve cap has a pair of handles extending radially from an outer surface of the side wall of the valve cap.

5. The valve assembly of claim 1, wherein the fluid that leaks toward the opening of the valve body is refrigerant.

6. The valve assembly of claim 1, wherein an inner diameter of the valve body is smaller than a smallest outer diameter of the integral sealing member.

7. The valve assembly of claim 1, wherein the valve body has a leading section at the opening that has a constant inner diameter and the tapered inner surface of the valve body follows the leading section, the leading section having the constant diameter and the tapered inner surface of the valve body tracking a constant outer diameter of the integral sealing member adjacent to the closed end of the integral sealing member and the tapered outer surface of the integral sealing member, respectively.

8. A refrigeration system comprising a valve assembly of claim 1.

9. A method for tightening a seal formed in a valve assembly, wherein the valve assembly includes:
   a first integrally formed structural member including a valve body that has a cylindrical wall and a free end defining an opening; and a second integrally formed structural member including a valve cap configured to close the opening of the valve body, the valve cap having:
  a side wall,
  a closed end connected to the side wall,
  an interior space defined by the side wall and the closed end,
  an integral sealing member extending from an inner surface of the closed end toward the interior space, the integral sealing member being cylindrical, flexible, and concentric with the side wall, the integral sealing member has a distal end and an outer surface,
  a first void space defined by an inner surface of the integral sealing member, and
  a second void space in an annular shape defined by the outer surface of the integral sealing member, an inner surface of the side wall of the valve cap and the inner surface of the closed end,
the method comprising:
extending at least part of the integral sealing member formed on the valve cap into the opening of the valve body to form a seal between an inner surface of the valve body and the outer surface of the integral sealing member;
pressurizing the integral sealing member against the inner surface of the valve body by increasing an internal pressure, which is caused by a flow of fluid leaking toward the opening of the valve body, thereby tightening the seal between the integral sealing member and the valve body;
inserting the free end of the valve body into the second void space, with the outer surface of the integral sealing member tapering toward the distal end of the integral sealing member and tapering inwardly toward the inner surface of the integral sealing member to facilitate the insertion; and
engaging the inwardly tapering outer surface of the integral sealing member located at the distal end of the integral sealing member with a tapered inner surface of the valve body, and
wherein an inner diameter of the valve body at a threaded section is smaller than an outer diameter of the integral sealing member.

10. The method for tightening a seal formed in a valve assembly of claim 9, wherein the tapered inner surface of the valve body tracks the inwardly tapering outer surface of the integral sealing member.

11. The method for tightening a seal formed in a valve assembly of claim 9, wherein an inner diameter of the valve body is smaller than a smallest outer diameter of the integral sealing member.

12. The method for tightening a seal formed in a valve assembly of claim 9, wherein the valve body has a constant inner diameter and the integral sealing member has a constant outer diameter, the constant inner diameter being smaller than the constant outer diameter.

13. The method for tightening a seal formed in a valve assembly of claim 9, further comprising: engaging a constant inner diameter of a leading section of the valve body and the tapered inner surface of the valve body following the leading section with a constant outer diameter of the integral sealing member adjacent to the closed end of the integral sealing member and the tapered outer surface of the integral sealing member, respectively.

* * * * *